No. 645,826. Patented Mar. 20, 1900.
G. A. NUSSBAUM.
RETARDING DEVICE FOR BOILER FLUES.
(Application filed Aug. 2, 1899.)

(No Model.) 5 Sheets—Sheet 1.

Witnesses
A. J. Pope

Inventor
G. A. Nussbaum
per Hubert E. Peck
Atty.

THE NORRIS PETERS CO., PHOTO-LITHO., WASHINGTON, D. C.

No. 645,826. Patented Mar. 20, 1900.
G. A. NUSSBAUM.
RETARDING DEVICE FOR BOILER FLUES.
(Application filed Aug. 2, 1899.)
(No Model.) 5 Sheets—Sheet 2.
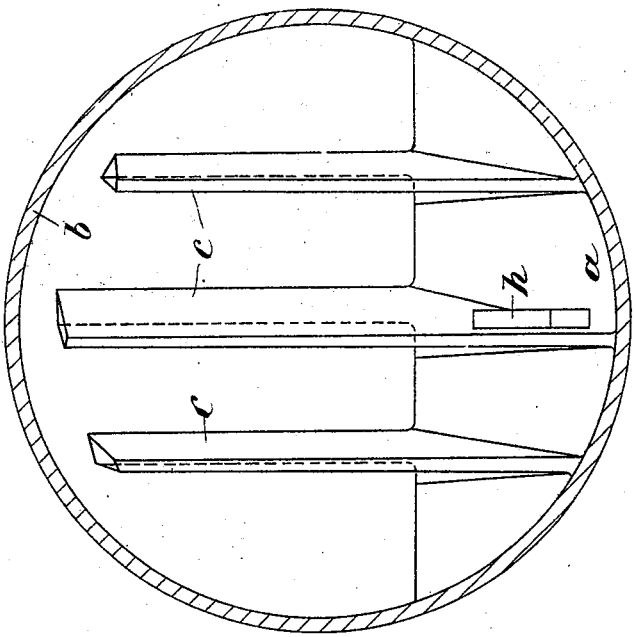
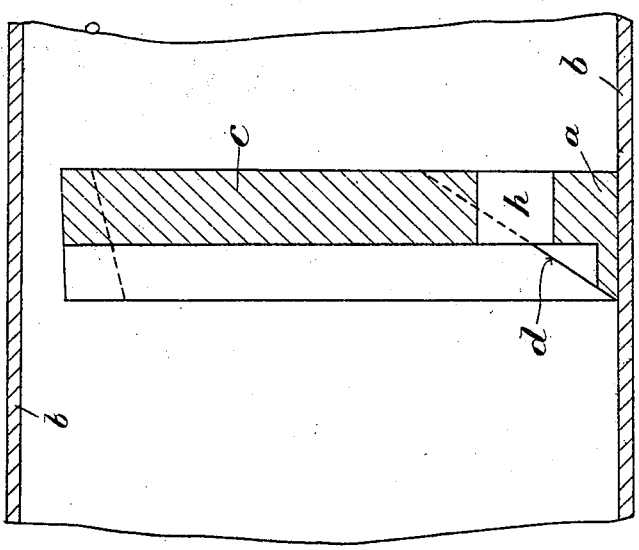
Witnesses
Inventor
G. A. Nussbaum
per Hubert Peck
atty
THE NORRIS PETERS CO., PHOTO-LITHO., WASHINGTON, D. C.

No. 645,826. Patented Mar. 20, 1900.
G. A. NUSSBAUM.
RETARDING DEVICE FOR BOILER FLUES.
(Application filed Aug. 2, 1899.)

(No Model.) 5 Sheets—Sheet 3.

No. 645,826. Patented Mar. 20, 1900.
G. A. NUSSBAUM.
RETARDING DEVICE FOR BOILER FLUES.
(Application filed Aug. 2, 1899.)
(No Model.) 5 Sheets—Sheet 4.
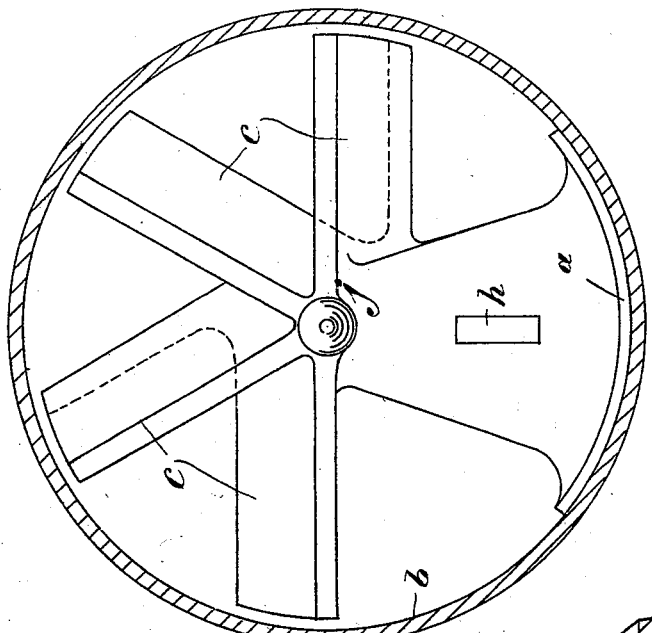
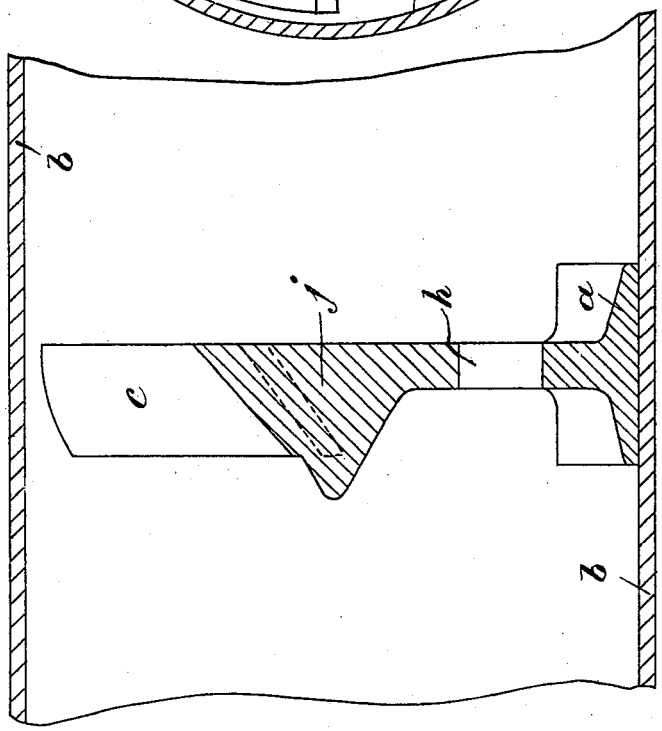
Witnesses
Inventor
G. A. Nussbaum
per Hubert E. Peck
atty
THE NORRIS PETERS CO., PHOTO-LITHO., WASHINGTON, D. C.

No. 645,826. Patented Mar. 20, 1900.
G. A. NUSSBAUM.
RETARDING DEVICE FOR BOILER FLUES.
(Application filed Aug. 2, 1899.)

(No Model.) 5 Sheets—Sheet 5.

UNITED STATES PATENT OFFICE.

GUILLAUME ARNAUD NUSSBAUM, OF LONDON, ENGLAND.

RETARDING DEVICE FOR BOILER-FLUES.

SPECIFICATION forming part of Letters Patent No. 645,826, dated March 20, 1900.

Application filed August 2, 1899. Serial No. 725,931. (No model.)

*To all whom it may concern:*

Be it known that I, GUILLAUME ARNAUD NUSSBAUM, a subject of the Queen of Great Britain and Ireland, residing at Ludgate Hill, London, England, have invented Improvements in Gas Mixing, Deflecting, and Retarding Devices for Steam-Boiler Flues, of which the following is a specification.

This invention has reference to gas mixing, deflecting, and retarding devices for use in the furnace-flues of steam-boilers, the object being to provide simple and effective means whereby the streams of hot gases and air flowing through such flues shall become effectually broken up and mixed together, so as to insure complete combustion thereof and so that the heated gases shall be brought into effective contact with the flue-walls, so that a large proportion of their heat shall be transmitted to the water in the boiler.

The invention consists for this purpose in novel constructions and arrangements of gas mixing, deflecting, and retarding devices, as hereinafter described and claimed, whereby the above-described object can be attained in a simple and convenient manner and without offering undue resistance to the flow of the hot gases through the furnace-flues.

Figure 1:
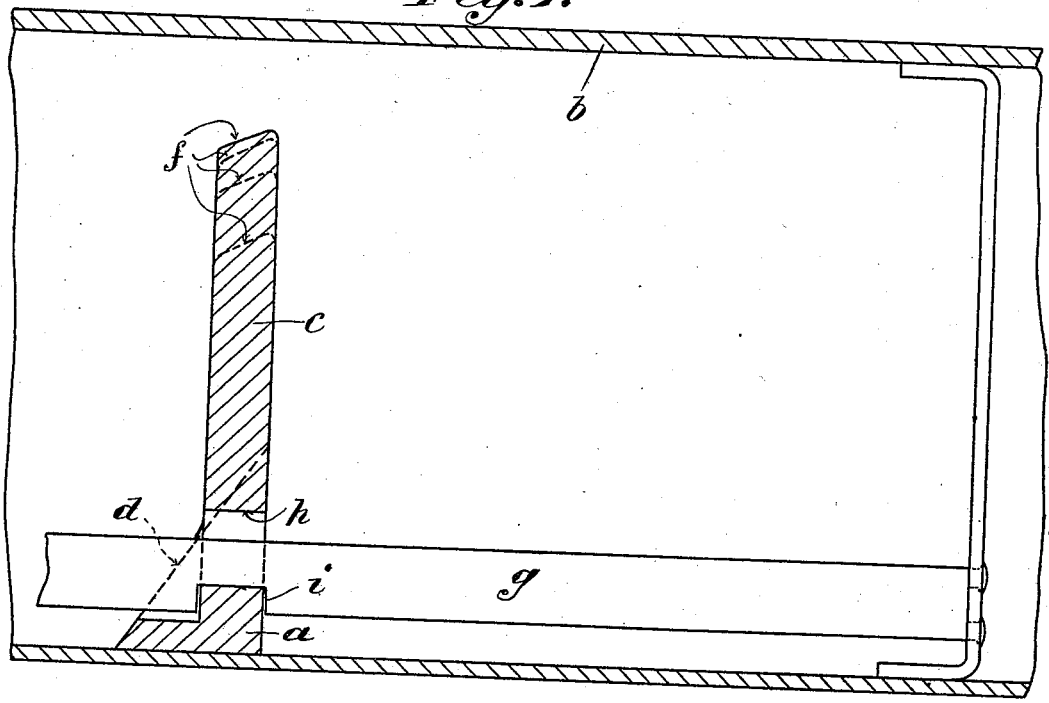
Figure 2:
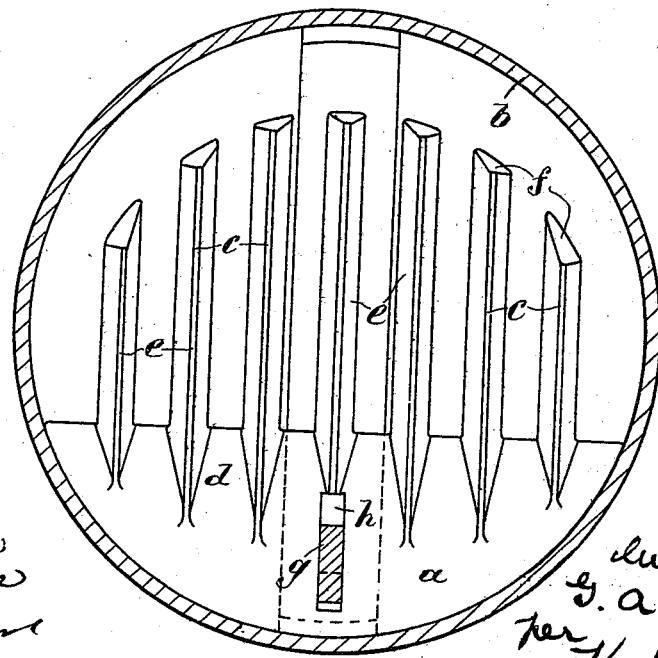

Figures 1 and 2 of the accompanying illustrative drawings show, respectively, in longitudinal section and cross-section a steam-boiler-furnace flue provided with gas mixing, deflecting, and retarding devices constructed and arranged according to this invention. Figs. 3 and 4, Figs. 5 and 6, Figs. 7 and 8, and Figs. 9 and 10 are similar views to Figs. 1 and 2, respectively, showing various forms which the said devices may take.

In the arrangement shown in Figs. 1 and 2 each of the gas mixing, deflecting, and retarding devices comprises a sole or base-piece $a$, made convex at its lower side to fit against and rest by its own weight upon the bottom of the furnace-flue $b$, and provided with a number of upwardly-extending bars $c$, that extend more or less across the upper part of the flue and present the appearance of a grid. The base-piece $a$ is made heavy and so as to present considerable surface to the bottom of the flue $b$, so that it will rest in close contact with the flue and serve to transmit heat in an efficient manner from the hot gases flowing through the flue to the water at the opposite side of the wall of the flue, such construction at the same time preventing overheating and rapid destruction of the said device. The front side of the base-piece $a$ and grid-bars $c$—that is to say, the side against which the hot gases impinge while flowing toward the chimney—are preferably beveled or inclined, so as to deflect the hot gases coming in contact with them outward against the wall of the flue. In the arrangement now being described the front of the base-piece $a$ has for the purpose mentioned an upwardly and backwardly inclined surface $d$, and the grid-bars $c$ laterally and backwardly inclined surfaces $e$, the said bars being of triangular section. The tops of the bars $c$ may also for a like purpose be inclined, as shown at $f$. The several mixing, deflecting, and retarding devices are arranged transversely in the flue $b$ at suitable distances apart. In the case of furnace-flues of comparatively-small cross-section, such as the flue or smoke-tubes of boilers of the locomotive type, the said devices may be maintained at the desired distance apart by distance-pieces located between them. The distance-pieces may conveniently be in one piece with one another and constitute a bar that is separate from the devices, but is adapted to be engaged therewith.

In Figs. 1 and 2 there is employed a bar $g$, that extends through a hole $h$ in the base-piece $a$ of each device and is formed at intervals with notches $i$ to receive and fit over parts of the several base-pieces $a$. The rear end of the bar may be secured to a metal cross-bar the ends of which are adapted to fit the flue $a$. By means of this bar the several devices can be readily and simultaneously pushed into or withdrawn from the flue-tube, and when in the tube can be maintained at the required distance apart.

Figs. 3 and 4 show a construction of mixing, deflecting, and retarding device similar to that shown in Figs. 1 and 2, but wherein the grid-bars $c$ extend upwardly nearly into contact with the top of the flue and are each inclined to a vertical plane passing through the center of the flue, so that the hot gases flowing between them will be directed to one side of the flue. By using several of such devices with the grid-bars of one inclined sidewise in an opposite direction to those of the next the hot gases flowing through the tubes can have a zigzag direction imparted to them.

Figure 6:
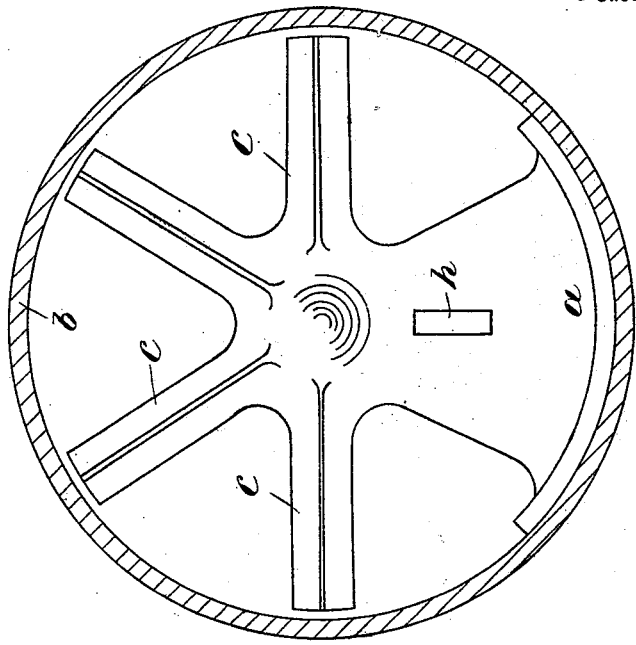
Figure 5:
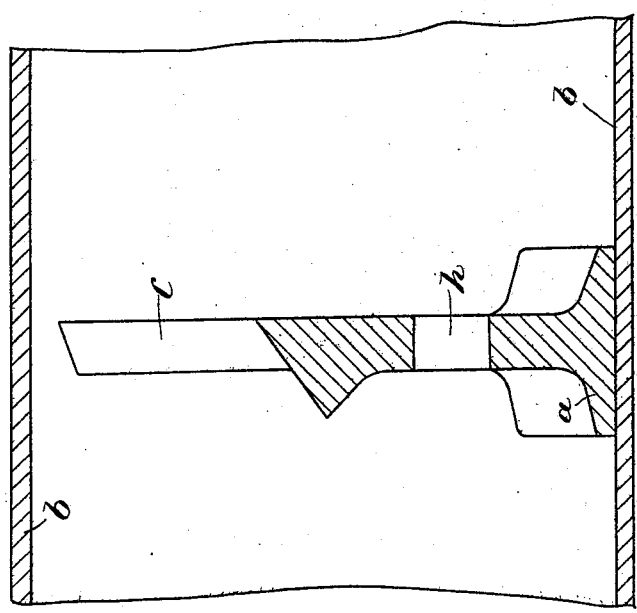

In Figs. 5 and 6 the mixing, deflecting, and retarding device consists of a base-piece $a$ with a number of radial bars $c$ extending from a solid center piece $j$, the front side of the arms and center piece being inclined, as before.

Figs. 7 and 8 show an arrangement somewhat like that shown in Figs. 5 and 6, but wherein the bars $c$ are made flat and wide and arranged to form screw-like blades or vanes whereby a circular motion will be imparted to the hot gases flowing past and between them.

Figure 9:
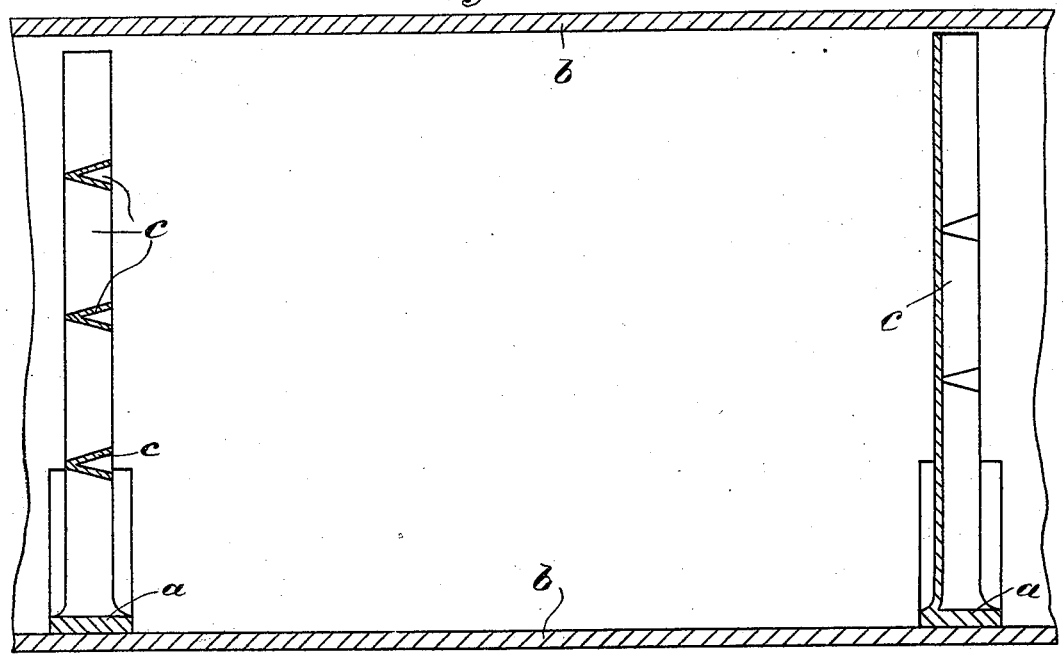
Figure 10:
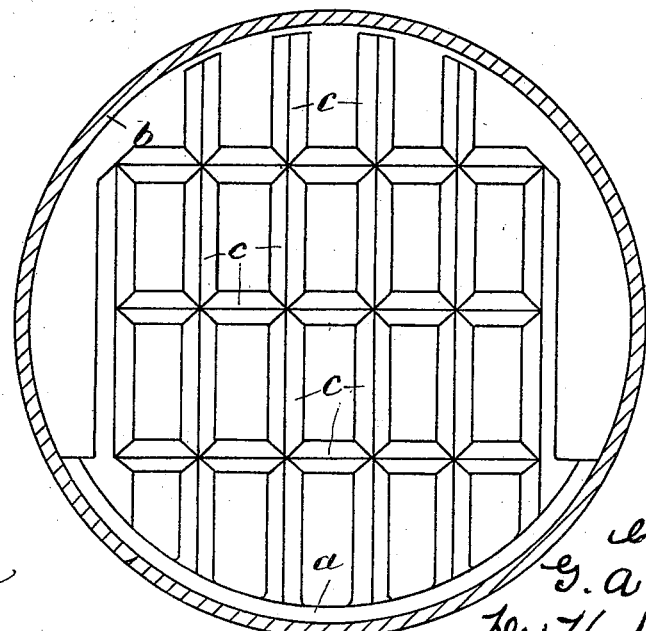

In Figs. 9 and 10 each of the gas mixing, deflecting, and retarding devices comprises a base-piece $a$ and a grid-like series of connected vertical and horizontal bars $c$, each of which is or may be of hollow or V section, the vertical and horizontal bars of one device being arranged opposite the spaces between the vertical and horizontal bars of the next adjacent devices. In the case of furnace-flues, such as those of Lancashire and Cornish boilers, the said gas mixing, heating, and retarding devices will be of such large size and weight that they will need to be put in place and removed separately, a bar, such as $g$ in Figs. 1 and 2, being then dispensed with.

The said devices may advantageously be made of metal conveniently in the form of castings or forgings; but they may, if desired, be made of refractory material, such as fire-clay. For use in large flues they may be each made in two or more parts to facilitate their insertion in place and withdrawal.

Gas mixing, deflecting, and retarding devices constructed and arranged as described in addition to effecting an intimate mixture of the hot gases and air so as to effect complete combustion of the gases and deflecting the heated gases against the wall of the furnace-flue also serve to divide up the flue into a series of combustion-chambers separated by highly-heated transverse divisions, whereby a more uniform temperature can be maintained throughout the length of the furnace-flue than usual and unequal expansion of the flue due to unequal temperatures at different parts thereof be greatly diminished. The said devices also tend to steady and check the flow of hot gases through the flue, and so prevent undue cooling of the flue by admission of cooler air on opening the fire-doors, and also to check downdraft, and by their use the gases can be considerably reduced in temperature before they are finally allowed to escape into the chimney.

What I claim is—

1. A gas mixing, deflecting and retarding device for a steam-boiler flue, comprising a wide heavy base-piece having a wide convex lower side adapted to rest upon and fit closely against the bottom of the flue and an inclined front surface, substantially as described for the purpose specified.

2. A gas mixing, deflecting and retarding device for a steam-boiler flue, comprising a wide heavy base-piece having a wide convex lower side adapted to rest upon and fit closely against the bottom of the flue and bars carried by and extending from the upper portion of said base-piece transversely across the flue, substantially as described.

3. A gas mixing, deflecting and retarding device for a steam-boiler flue, comprising a wide heavy base-piece having a wide convex lower side adapted to rest upon and fit closely against the bottom of the flue and bars carried by and extending from the upper portion of said base-piece transversely across the flue and having inclined front sides substantially as described for the purpose specified.

4. A gas mixing, deflecting and retarding device for a steam-boiler flue, comprising a wide heavy base-piece having a wide convex lower side adapted to rest upon and fit closely against the bottom of the flue and grid-like bars extending transversely of said flue from the upper portion of said base-piece, substantially as described.

5. A gas mixing, deflecting and retarding device for a steam-boiler flue, comprising a wide heavy base-piece adapted to rest upon the bottom of a flue and upwardly-extending grid-like bars adapted to extend across said flue, the front side of said base-piece and bars being inclined, substantially as described for the purposes specified.

6. A gas mixing, deflecting and retarding device for a furnace-flue, comprising a wide heavy metal base-piece adapted to rest upon the bottom of a flue and having integral therewith a plurality of metal bars adapted to extend across the upper part of said flue, substantially as described.

7. A mixing, deflecting and retarding device for a furnace-flue comprising a metal base-piece having a wide convex lower surface and a plurality of parallel grid-like bars extending upwardly therefrom, substantially as described.

8. A gas mixing, deflecting and retarding device for a furnace-flue, comprising a wide heavy metal base-piece having a convex lower surface and an upwardly-inclined front surface and a plurality of parallel grid-like metal bars extending upward from and integral with said base-piece and of triangular section, substantially as described.

Signed at 77 Cornhill, London, E. C., England, this 22d day of July, 1899.

GUILLAUME ARNAUD NUSSBAUM.

Witnesses:
PERCY E. MATTOCKS,
EDMUND S. SNEWIN.